United States Patent [19]

Rockwood

[11] Patent Number: 5,591,020
[45] Date of Patent: Jan. 7, 1997

[54] PUMP OIL MISTER

[75] Inventor: Robert E. Rockwood, Windham, N.H.

[73] Assignee: Environamics Corporation, Hudson, N.H.

[21] Appl. No.: 246,150

[22] Filed: May 19, 1994

[51] Int. Cl.⁶ .................................................. F04B 35/04
[52] U.S. Cl. ........................... 417/423.13; 417/423.12; 184/11.2; 184/6.26; 415/175
[58] Field of Search .................. 417/423.12, 423.13; 415/109, 175; 184/11.1, 11.2, 6.26, 55.1

[56] References Cited

U.S. PATENT DOCUMENTS

| | | |
|---|---|---|
| 1,749,247 | 3/1930 | Graham . |
| 2,331,299 | 10/1943 | Blom . |
| 2,386,505 | 10/1945 | Puchy . |
| 2,447,671 | 8/1948 | Schuck . |
| 2,485,537 | 10/1949 | Rae, Jr. . |
| 2,849,262 | 8/1958 | Wood, Jr. et al. . |
| 3,115,097 | 12/1963 | Zagar et al. . |
| 3,457,871 | 7/1969 | Herger ..................... 415/175 |
| 3,515,497 | 6/1970 | Studebaker et al. . |
| 3,624,763 | 11/1971 | Rohr . |
| 3,763,961 | 10/1973 | Casale ..................... 184/11.2 |
| 3,923,416 | 12/1975 | Frey . |
| 4,439,096 | 3/1984 | Rockwood et al. . |
| 5,261,676 | 11/1993 | Rockwood . |
| 5,340,273 | 8/1994 | Rockwood ............... 417/423.12 |

FOREIGN PATENT DOCUMENTS

| | | |
|---|---|---|
| 3723125 | 1/1989 | Germany . |
| 545917 | 6/1942 | United Kingdom . |

*Primary Examiner*—Charles G. Freay
*Attorney, Agent, or Firm*—Myers Liniak & Berenato

[57] ABSTRACT

A pump including a pump shaft bearing lubrication system having a main lubrication chamber (45) and a pair of auxiliary lubrication chambers (55 and 57), the auxiliary chambers being disposed on opposite sides of said main chamber. Pump shaft bearing assemblies (single or double row) are sandwiched between each auxiliary lubrication chamber and the main chamber (45) so that each bearing assembly (31 and 33) has its inner and outer sides simultaneously lubricated by fluid in the main and corresponding auxiliary chamber respectively. Each auxiliary lubrication chamber (55 and 57) is provided with a pair of fluid passageways (61 and 63) interfacing the auxiliary and main chambers so that the lubricating fluid can be circulated from the main chamber (45) to the auxiliary chambers (55, 57) and then back into the main chamber again, thereby constantly lubricating the bearing assemblies with cool, clean, and effective lubricating fluid. Furthermore, a lubricating fluid dispenser (35) is mounted on the pump shaft (7) within the main chamber (45), the dispenser (35) being positioned entirely above the lubricating fluid level such that heat generation within the main chamber is reduced, the dispenser dispersing the lubricant throughout the main chamber by way of an air-flow created by vanes (50, 51) defined in the dispenser.

13 Claims, 4 Drawing Sheets

PUMP OIL MISTER

This invention relates to a bearing lubrication system for a pump. More particularly, this invention relates to a bearing lubrication system disposed within a pump for lubricating bearings rotatably supporting the pump shaft.

BACKGROUND OF THE INVENTION

Environmentally hazardous fluids such as acids, oils, and toxins, which can cause serious harm to the environment often need to be pumped through fluid flow systems from one location to another. Centrifugal pumps typically including a motor driven impeller affixed to the pump shaft are typically utilized to pump these fluids. The pump shafts of such pumps are generally rotatably supported against radial movement and vibration by conventional pump shaft bearings (e.g. ball bearings). These bearings must be continually lubricated throughout the operation of the pump in order to maintain an adaptable operating life of the bearings and corresponding pump.

Conventional lubricating fluid such as oil is used to lubricate such pump shaft bearings, this fluid typically being housed in a bearing lubrication chamber surrounding the pump shaft. When pumping such dangerous flow materials, it is important that neither the lubricating fluid (e.g. oil) nor the fluid being pumped escape into the atmosphere or adjacent fragile pump areas. Thus, seals must be provided.

Conventional pumps typically include supporting shaft ball bearings disposed within a lubrication chamber, the bearings for rotatingly supporting the shaft as it is driven by a motor. Such bearings are generally lubricated by having the oil level within the lubrication chamber maintained at a level about half-way up the bottom bearing ball. The maintaining of the lubricating oil level half-way up the bottom bearing ball necessarily means that when the shaft and supporting bearings are rotated, the bearing balls must continuously plow through the lubricating oil in which they are partially submerged. This results in significant heat generation due to the friction created by the bearing balls forever passing through the viscous oil.

Furthermore, when the oil level is disposed halfway up the bearing balls or higher as is conventional in the art, dirt or contaminants present within the oil are easily permitted to make their way into the bearing raceways through which the bearing balls circumferentially rotate or roll around the pump shaft. As will be recognized by those of skill in the art, the allowance of dirt or other contaminants into the bearing raceways often leads to premature failure of the bearings and increased maintenance. Accordingly, it would satisfy a long-felt need in the art if a pump were to be developed so as to include an oil misting or lubrication chamber wherein the lubricating fluid (e.g. oil) level was disposed below the bearing balls, thereby reducing heat generation within the lubrication chamber and limiting the amount of dirt or other contaminants permitted to make their way into the bearing raceways.

Commonly owned U.S. Pat. No. 5,261,676, which is prior art to the instant invention due to an offer of sale more than one year before the instant filing date, discloses a centrifugal environmentally sealed pump including a bearing lubrication chamber. Disposed within the lubricated chamber is an oil dispenser affixed to the pump shaft for rotation therewith. The rotating dispenser has a plurality of hoods which protrude therefrom, these hoods acting to pick up and disperse (i.e. splash and/or mist) the lubricating oil throughout the chamber so as to lubricate the pump shaft bearings therein. The hoods affixed to the rotating dispenser protrude so as to dip below the lubricating oil level within the chamber as the dispenser is rotated thus scooping the oil from the reservoir area and dispersing it throughout the chamber and toward the adjacent bearings.

While the bearing lubrication system of the '676 patent is excellent and provides good results, the hoods of the dispenser are required to plow through the lubricating oil housed within the lubrication chamber in order to properly disperse the oil throughout the chamber. This generates undesirable heat within the lubrication chamber thus requiring the bearings to run at an increased temperature thereby resulting in increased maintenance requirements. Furthermore, as a result of the hoods of the '676 dispenser picking up the lubricating oil and subsequently delivering it throughout the chamber, dirt and other contaminants such as rust, carbonized particles, etc. are directed toward the bearings along with the picked up lubricating oil.

Additionally, the dispenser of the '676 patent directs lubricating fluid toward only one side of each shaft bearing. After reaching the bearing balls of a particular bearing, the lubricating fluid or oil relies upon rotation of the bearings within their respective raceways for allowing the oil to migrate throughout the entire bearing assembly. Thus, with respect to the double row bearing disposed between the dispenser and motor in the '676 patent, the bearing furthest from the dispenser and lubrication chamber is only lubricated by way of oil or lubricating fluid which makes its way through the first bearing row, the first bearing row, of course, being disposed between the lubrication chamber and the second bearing row.

Bearing frame seals are provided adjacent both the single and double row bearing assemblies of the '676 patent, these bearing frame seals being positioned on the side of the bearings located furthest from the lubrication chamber. The purpose of these bearing frame seals is to prevent the oil or lubricating fluid within the bearings from leaking or migrating into other parts of the pump or the surrounding environment. As a result, the lubricating fluid or oil which ends up sandwiched between the bearing balls and an adjacent bearing frame seal often remains there for an extended period of time without being circulated back into the lubrication chamber. This, of course, may result in dirt or contaminant particles being trapped within the bearing assembly for extended periods of time as well as the lubricating oil or fluid disposed between the bearing balls and adjacent bearing frame seals prematurely breaking down. Thus, it would satisfy a long-felt need in the art if the lubricating fluid disposed between the bearing balls and adjacent bearing frame seals furthest from the lubrication chamber could be circulated to and from the lubrication chamber so as to keep clean, cool, and effective lubricating fluid adjacent the exterior or outer sides of the bearing balls at all times.

It is apparent from the above that there exists a need in the art for a pump including a bearing lubrication system wherein: 1) the lubricating fluid dispenser does not contact or dip below the lubricating fluid level within the lubrication chamber thereby allowing the bearings and pump shaft to run at lower operating temperatures within the lubrication chamber; 2) the lubricating fluid level is maintained at a level below the bearing balls disposed in the lubrication chamber so as to reduce heat generation; 3) both sides of the single and/or double row bearing assemblies are simultaneously lubricated by way of lubricating fluid so as to ensure prompt and constant bearing lubrication; and 4) clean, cool, and effective lubricating fluid is maintained along the exterior or outer side of the bearing assemblies between the bearing frame seals and adjacent bearing balls so as to extend the life of the bearings.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a motor driven pump comprising:

a pumping chamber in which fluid to be pumped is pumped between a fluid inlet and a fluid outlet;

a motor for driving a shaft having first and second ends, the first end being affixed to the motor and the second end connected to a fluid pumping impeller, the impeller being disposed within the pumping chamber for pumping the fluid to be pumped from the fluid inlet toward the fluid outlet;

a main lubrication chamber housing a lubricating fluid disposed along the shaft, the lubricating fluid for lubricating a shaft bearing assembly rotatably supporting the shaft, the bearing assembly disposed adjacent the main chamber;

a dispenser affixed to the shaft within the main lubrication chamber for rotation therewith, the dispenser for dispersing the lubricating fluid housed in the main lubrication chamber throughout the main chamber and toward the inner side of the shaft bearing assembly, the inner side facing the dispenser; and a lubricating fluid circulatory passageway interfacing the main lubrication chamber with an auxiliary lubrication chamber, the auxiliary chamber for allowing the lubricating fluid therein to lubricate the outer side of the shaft bearing assembly, and wherein the circulatory passageway permits the lubricating fluid to make its way from the main lubrication chamber to the auxiliary lubrication chamber disposed adjacent the outer side of the shaft bearing assembly so that both the inner and outer sides of the shaft bearing assembly are simultaneously lubricated by said lubricating fluid within the main and auxiliary lubrication chambers, respectively, thereby providing improved bearing lubrication and reduced friction so as to prolong the operating life of the bearing assembly.

This invention further fulfills the above-described needs in the art by providing a motor driven pump comprising:

a motor driven pump shaft connected to a motor at one end thereof;

first and second coaxially aligned pump shaft bearing assemblies surrounding and rotatably supporting the pump shaft, the first and second bearing assemblies being spaced apart from one another along the pump shaft;

a main lubrication chamber disposed along the pump shaft adjacent and between the first and second pump shaft bearing assemblies, the main lubrication chamber housing lubricating fluid for lubricating the first and second bearing assemblies disposed adjacent the main lubrication chamber; and a lubricating fluid dispenser affixed to the pump shaft for rotation therewith, the dispenser being disposed within the main lubrication chamber entirely above the lubricating fluid level and between the first and second pump shaft bearing assemblies, and wherein the dispenser when rotated along with the pump shaft creates an air-flow within the main lubrication chamber which causes the lubricating fluid to be dispersed throughout the main lubrication chamber so as to continually lubricate the first and second bearing assemblies as the pump shaft is rotated by the motor, the positioning of the dispenser entirely above the lubricating fluid level reducing heat generation within the main chamber so as to allow the first and second bearing assemblies to run at reduced temperatures so as to prolong their operating life.

In certain preferred embodiments of this invention, the pump includes a recirculation means for circulating lubricating fluid housed within the main lubrication chamber to and from the outer side of conventional shaft bearing means so that the inner and outer sides of the shaft bearing means are simultaneously lubricated by the lubricating fluid.

In certain other preferred embodiments of this invention, the dispenser includes a plurality of air-flow creating vanes for creating the air-flow within the main lubrication chamber which causes the lubricating fluid to be dispersed throughout the main chamber and lubricate the first and second bearing assemblies, the dispenser being substantially annular in nature with one of the air-flow creating vanes being a continuous vane disposed completely around the circumference of the dispenser and a plurality of lateral vanes extending along the shaft away from the continuous vane, the lateral vanes extending in directions substantially perpendicular to the continuous vane.

This invention will now be described with respect to certain embodiments thereof, accompanied by certain illustrations, wherein:

DETAILED DESCRIPTION OF CERTAIN EMBODIMENTS OF THIS INVENTION

Referring now more particularly to the accompanying drawings in which like reference numerals indicate like parts throughout the several views.

Figure 1:
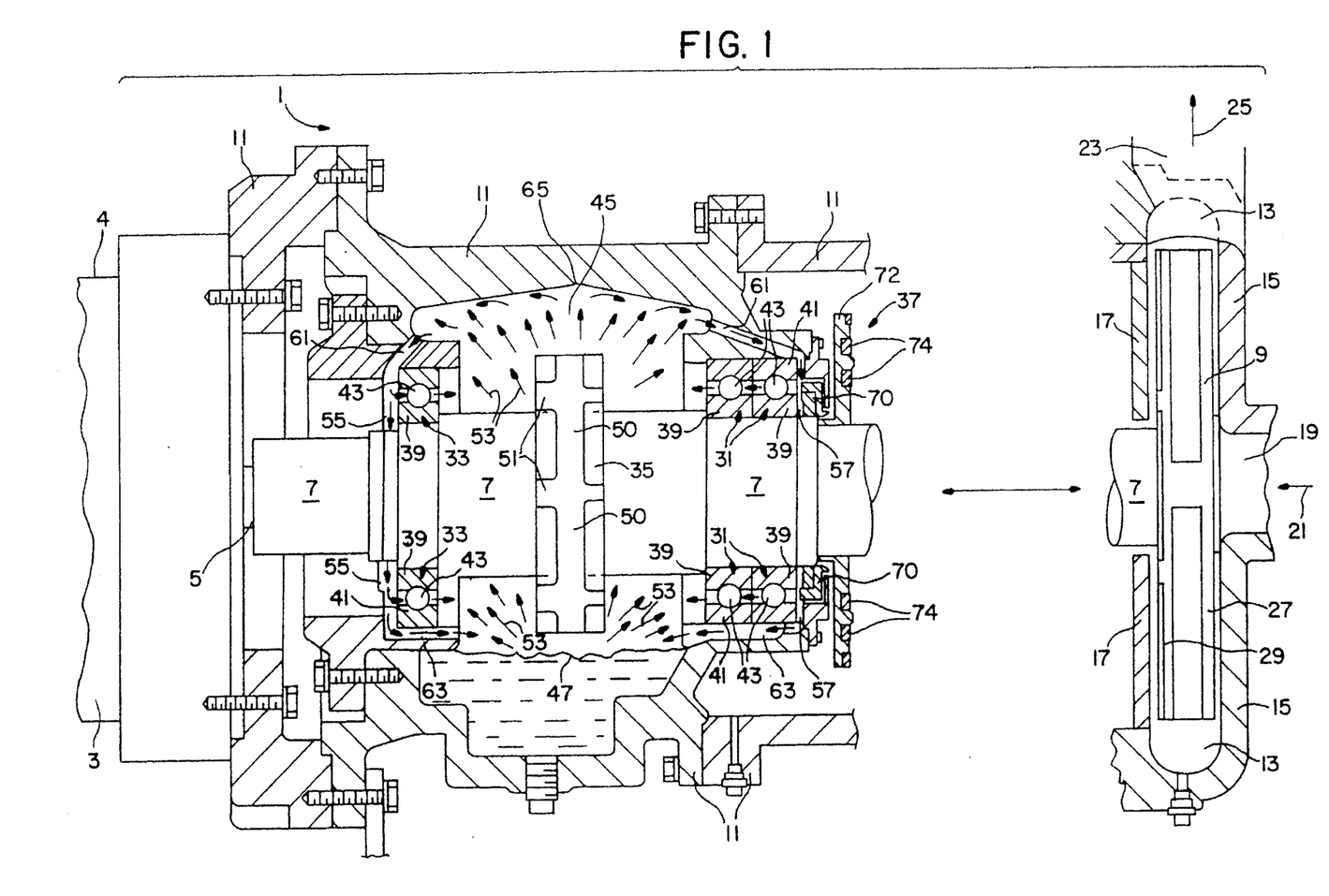
FIG. 1 is a side elevational longitudinal partial cross-sectional view of a centrifugal environmentally sealed pump including a shaft bearing lubrication system according to an embodiment of this invention, the pump being shown cross-sectionally except for the shaft, dispenser, motor, and impeller which are illustrated in a side elevational nature.

FIG. 1 is a side elevational partial cross-sectional view of a centrifugal environmentally sealed pump including a shaft bearing lubrication system according to an embodiment of this invention. The pump and lubrication system according to this embodiment shown in FIG. 1 are illustrated cross-sectionally except for the pump motor, shaft, impeller, and dispenser which are shown in a side elevational nature. Pump 1 is a hermetically sealed pump preferably used for pumping hazardous fluids such as acids, oils, and the like, but, of course, may also be used for pumping non-hazardous materials.

Pump 1 includes electric motor 3 hermetically sealed within metallic motor housing 4. Motor 3 includes drive shaft 5 which is coupled at one longitudinal end to pump shaft 7, pump shaft 7 being affixed at one end to impeller 9 and at the other end to motor drive shaft 5. Alternatively, drive shaft 5 may act as the pump shaft and be connected to impeller 9.

In certain embodiments of this invention, an inert gas (e.g. nitrogen) may be introduced into motor housing 4 so as to hermetically seal motor 3 within housing 4 thereby prohibiting the entrance of foreign materials or contaminants thereinto with, of course, housing 4 being sealingly affixed to pump housing 11.

Impeller 9 of pump 1 is disposed within volute 13 formed by metal casing portion 15 and radially extending backplate 17. Volute 13 defines the pumping chamber of pump 1, this pumping chamber including axially extending opening 19 defining a fluid inlet or in-flow path 21, and radially extending opening 23 forming a fluid outlet or out-flow path 25. As the fluid to be pumped flows into volute 13 by way of fluid inlet opening 19, disk shaped rotating impeller 9 forces a substantial portion of the fluid radially outward through opening 23 and out-flow path 25 thereby pumping the fluid to be pumped.

Impeller 9 of the conventional closed type as shown, is coaxially affixed to pump shaft 7 for rotation therewith and includes a pair of integrally formed circular facing plates 27 and 29. A plurality of curved vanes (not shown) interconnecting plates 27 and 29 allow impeller 9 to pump the fluid within volute 13 from fluid inlet opening 19 toward fluid outlet opening 23. Alternatively, a conventional open type impeller may be used.

Rear plate 29 of impeller 9 is threadedly attached to pump shaft 7 so as to rotate therewith when powered by motor 3. The structural and functional details of impeller 9 and volute 13 are more thoroughly discussed in commonly owned U.S. Pat. No. 5,261,676 and commonly owned co-pending U.S. Ser. No. 08/200,012, filed Feb. 22, 1994, the disclosures of which are hereby incorporated herein by reference.

Referring now to FIGS. 1–5, conventional annular bearing assemblies 31 and 33 are affixed to pump shaft 7 so as to support rotation of shaft 7 as driven by motor 3. Bearing assembly 31 disposed between dispenser 35 and impeller 9 is of the double row type meaning that two separate bearings are disposed adjacent one another. In the meantime, bearing assembly 33 disposed between lubricating fluid dispenser 35 and motor 3 is a single row bearing in certain embodiments of this invention. Double row annular bearing assembly 31 as will be recognized by those of skill in the art provides more support to shaft 7 then does annular single row bearing assembly 33. Accordingly, double row bearing assembly 31 is disposed closest to sealing assembly 37 so as to reduce vibration occurring therein. By reducing vibration within sealing assembly 37, the seals thereof are more effective. Alternatively, either double or single row bearing assemblies may be used in the positions occupied by assemblies 31 and 33 in this particular embodiment.

Figure 2:
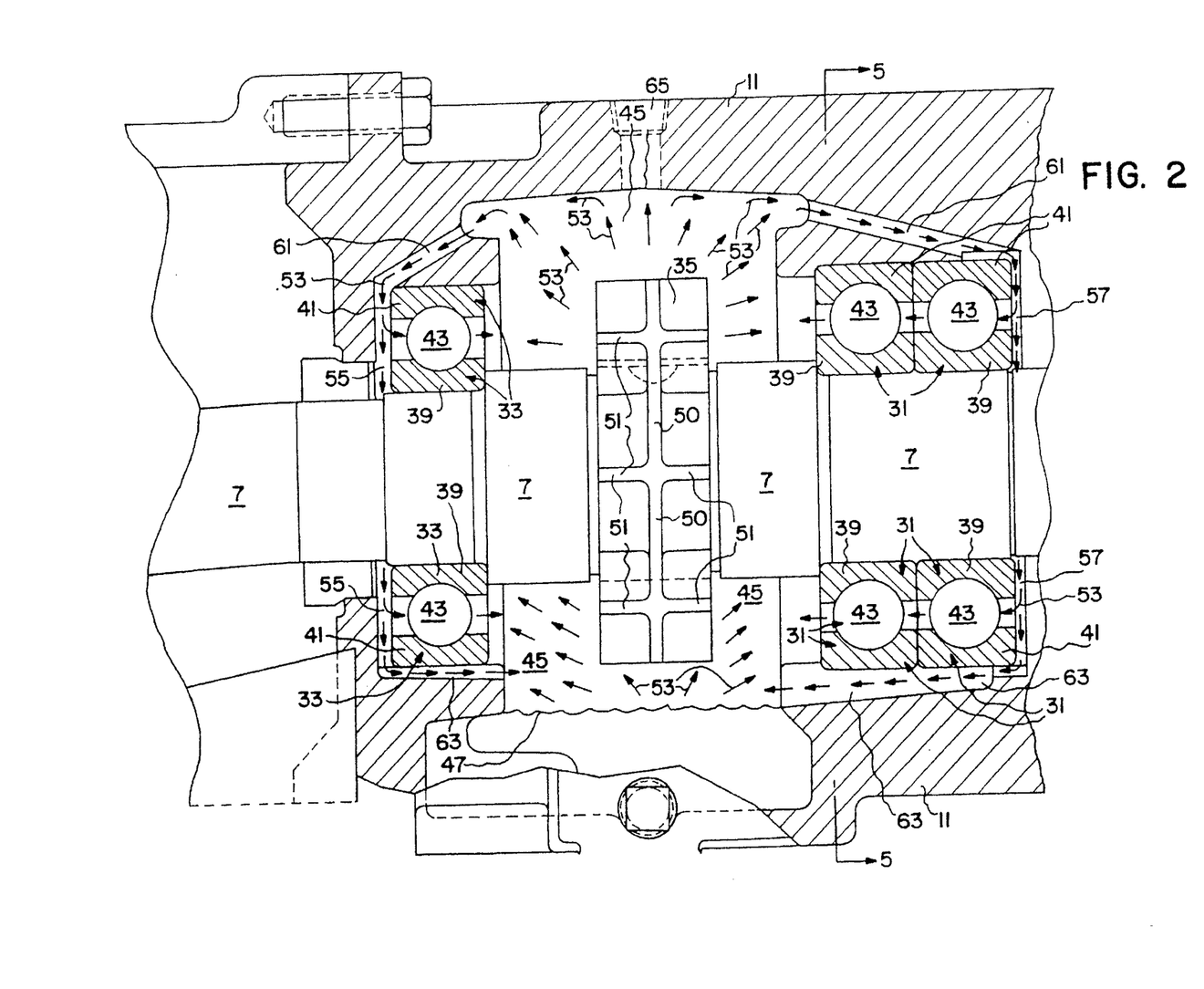
FIG. 2 is an enlarged side elevational longitudinal partial cross-sectional view of the pump including the shaft bearing lubrication system of the FIG. 1 embodiment of this invention, the pump being shown cross-sectionally save the shaft and dispenser which are illustrated in a side elevational nature.
Figure 3:
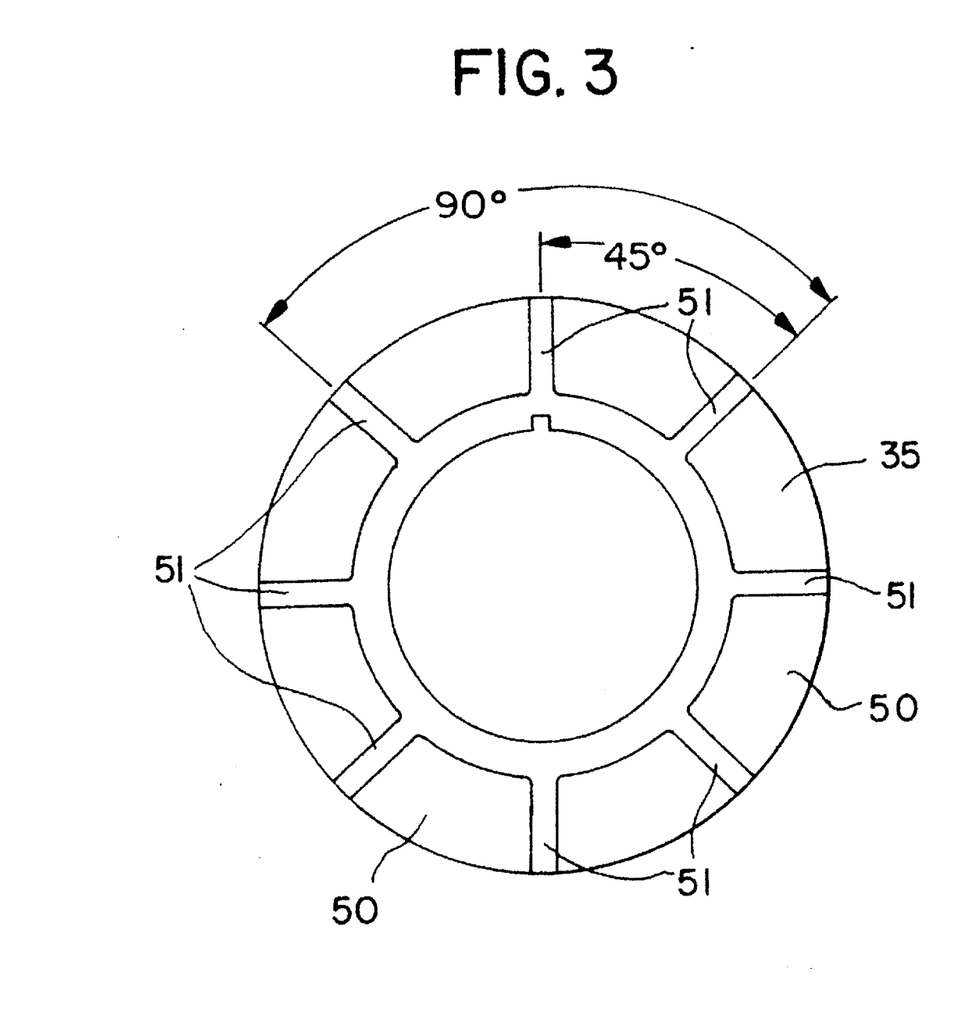
FIG. 3 is a front elevational view of the dispenser of the lubrication system of the aforesaid embodiment of this invention as viewed from either the motor or impeller end of the pump.
Figure 4:
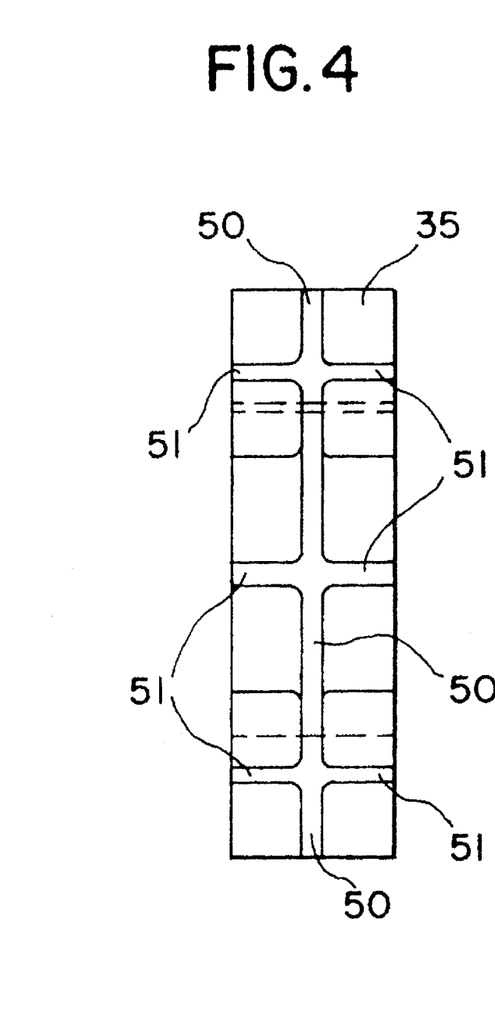
FIG. 4 is a side elevational view of the dispenser of the lubrication system of the aforesaid embodiment of this invention.

Bearing assemblies 31 and 33 are conventional in nature in that they each include an annular rotating bearing frame portion 39 affixed to pump shaft 7 for rotation therewith. Furthermore, each bearing assembly 31 and 33 includes a fixed bearing frame portion 41 which is stationary and mounted to pump housing 11. Bearing balls 43 of bearing assemblies 31 and 33 are disposed between annular bearing frame portions 39 and 41, balls 43 being disposed within annular raceways circumferentially surrounding pump shaft 7, the annular raceway of each bearing assembly 31 and 33 being defined by the outer annular periphery of bearing frame portion 39 and the inner annular periphery of stationary bearing frame portion 41.

Bearing assembly 31 as shown has a larger diameter than does assembly 33 in certain embodiments of this invention because of the corresponding outer diameter of shaft 7 at the locations corresponding to assemblies 31 and 33.

When motor 3 of pump 1 drives pump shaft 7, annular bearing frame portions 39 rotate along with shaft 7. Due to the rotation of frame portions 39, bearing balls 43 are caused to rotate circumferentially through their respective bearing raceways around pump shaft 7 as the shaft is driven by motor 3 thereby supporting the rotation of pump shaft 7 against radial movement and vibration.

Due to the often extreme speeds at which pump shaft 7 may be driven, bearing assemblies 31 and 33 require constant lubrication. In order to provide lubrication to pump shaft bearing assemblies 31 and 33, a predetermined amount of conventional lubricating fluid (e.g. lubricating oil) is disposed within main lubrication chamber 45. The lubricating fluid within main lubrication chamber 45 is maintained at a predetermined level 47.

In certain embodiments of this invention, lubricating fluid level 47 is maintained within main lubrication chamber 45 at a point below bearing balls 43 as shown in FIGS. 1 and 2. This provision of level 47 below the rotating portions (i.e. bearing balls 43 and rotating bearing frame portions 39) of bearing assemblies 31 and 33 reduces the amount of heat generated within chamber 45 because bearing balls 43 and rotating frame portions 39 are not submerged in and required to plow through the lubricating fluid when pump shaft 7 is rotated. Thus, lower operating temperatures are maintained and maintenance requirements reduced.

As will be appreciated by those of skill in the art, however, the lubrication system will still be effective if level 47 is maintained at a level substantially half-way up balls 43.

Main chamber 45 may hold about 1.5 quarts of oil or other conventional lubricating fluid when filled up to about the inner diameter of one of portions 41 in certain embodiments of this invention.

In order to continually lubricate bearing assemblies 31 and 33, substantially annular lubricating fluid dispenser 35 is affixed to pump shaft 7 for rotation therewith, dispenser 35 being disposed within main lubrication chamber 45. Dispenser 35 includes a plurality of air-flow creating vanes 50 and 51 defined therein, vane 50 being substantially continuous in nature and extending circumferentially around the outer periphery of dispenser 35. Numerous lateral vanes 51 are provided on dispenser 35, vanes 51 extending axially along pump shaft 7 from continuous vane 50. In other words, air-flow creating vanes 51 extend laterally outward from continuous vane 50, the extension directions of vanes 50 and 51 being substantially perpendicular to one another as shown in FIGS. 1–4. In certain embodiments of this invention, sixteen such lateral vanes 51 are provided on dispenser 35, eight on each side of continuous vane 50 so as to provide substantially equal lubrication to bearing assemblies 31 and 33. However, the number and design of the vanes may be adjusted as will be appreciated by those of skill in the art.

When pump shaft 7 is rotated as driven by motor 3, dispenser 35 is driven along therewith. Rotation of dispenser 35 including air-flow creating vanes 50 and 51 creates a substantial air-flow within main lubrication chamber 45 adjacent lubricating fluid or oil level 47. This air-flow created by the rotation of dispenser 35 disperses (i.e. mists and/or splashes) the lubricating fluid throughout main chamber 45 so that bearing assemblies 31 and 33 are continually lubricated by the misted or splashed lubricating fluid within the chamber.

Directional arrows 53 illustrated in FIGS. 1 and 2 illustrate the directions of dispersement and flow of the lubricating fluid throughout main chamber 45 and beyond.

As a result of the substantially symmetrical orientation of lateral vanes 51 about either side of continuous vane 50 on dispenser 35, the lubricating fluid is kicked up or misted in substantially equal amounts toward both bearing assemblies 31 and 33 respectively. As can be seen by directional arrows 53, the air-flow created by dispenser 35 directs a continual stream of lubricating fluid toward bearing balls 43 of both bearing assemblies 31 and 33 as shaft 7 is rotated.

While the lubricating fluid disposed within main lubrication chamber 45 is directed toward and lubricates the inner or interior sides (the sides facing dispenser 35 and chamber 45) of bearing assemblies 31 and 33 respectively, auxiliary lubrication chambers 55 and 57 are provided adjacent the outer or exterior sides (the sides facing away from chamber 45) of bearing assemblies 31 and 33. As shown, the interior or inner sides of bearing assemblies 31 and 33 face dispenser 35 and main lubrication chamber 45, while the outer or exterior sides of bearing assemblies 31 and 33 face impeller 9 and motor 3, respectively.

Lubricating fluid disposed in auxiliary lubrication chambers 55 and 57 lubricates the outer sides of bearing assemblies 31 and 33 as shown in FIGS. 1-2 by arrows 53. Accordingly, as a result of the provision of main lubrication chamber 45 along with corresponding auxiliary lubrication chambers 55 and 57, both the inner and outer sides of bearing assemblies 31 and 33 are simultaneously lubricated by the lubricating fluid originating in main chamber 45 and being partially dispersed from chamber 45 into chamber 55 and 57.

Each auxiliary chamber 55 and 57 is provided with both a circulatory passageway 61 for permitting the lubricating fluid in main chamber 45 to flow into the appropriate auxiliary chamber 55 or 57, and a return passageway 63 for permitting the fluid within each auxiliary chamber 55 and 57 to be recirculated back into main chamber 45. The circulatory passageway 61 and return passageway 63 corresponding to each auxiliary lubricating chamber 55 and 57 interface their particular auxiliary chamber with main lubrication chamber 45 thus defining lubricating fluid flow passageways therebetween.

Pump housing 11 adjacent main lubrication chamber 45 is formed so as to taper upwardly from passageways 61 to define apex 65. The tapered design of housing 11 within main lubrication chamber 45 to apex 65 allows the lubricating fluid which is directed upwardly towards the top of chamber 45 via dispenser 35 to be directed via the inner tapered portions of housing 11 toward circulatory passageways 61. After reaching passageways 61, the lubricating fluid flows downward through conduits 61 and into auxiliary lubrication chambers 55 and 57 adjacent the exterior or outer sides of bearing assemblies 33 and 31 respectively.

Figure 5:
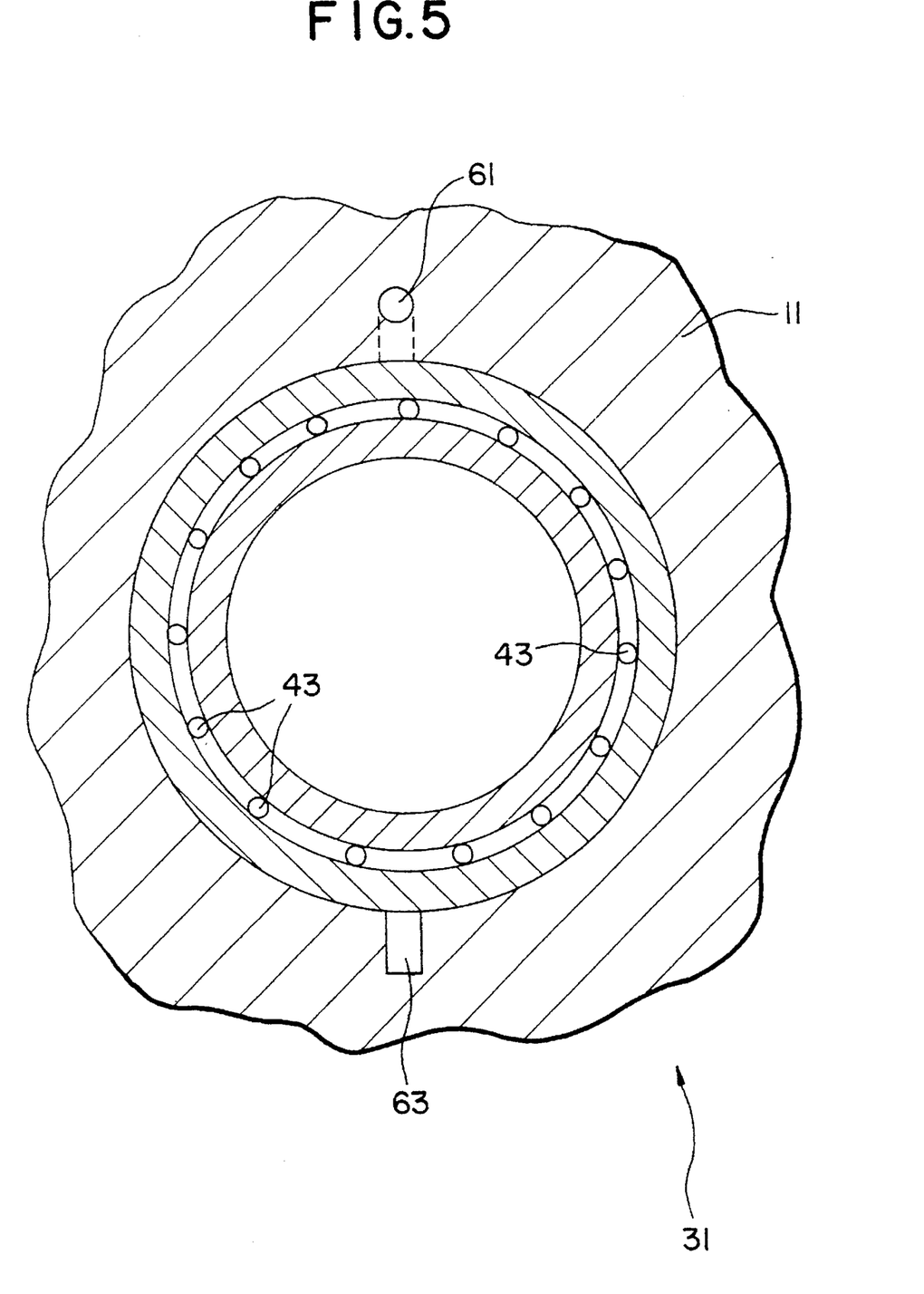
FIG. 5 is a cross-sectional rear view of bearing assembly 31 taken cross-sectionally from the point shown in FIG. 2.

The lubricating fluid disposed within auxiliary chambers 55 and 57 is recirculated back into main chamber 45 by way of return passageways 63 disposed below fixedly mounted bearing frame portions 41 of bearing assemblies 31 and 33, return passageways being notches defined between frame portions 41 and housing 11 as shown in FIG. 5.

In certain embodiments of this invention, circulatory passageways 61 connect the upper end of main chamber 45 with auxiliary chambers 55 and 57 such that the chamber 45 ends of passageways 61 are disposed substantially above auxiliary chamber ends of passageways 61 so as to allow the lubricating fluid from chamber 45 to flow downward from the top of chamber 45 toward auxiliary chambers 55 and 57 in accordance with the force of gravity.

Additionally, circulatory or auxiliary chamber entrance passageways 61 are connected to auxiliary chambers 55 and 57 at the top or upper ends thereof with respect to gravity in certain embodiments of this invention while return passageways 63 interface the lower ends of auxiliary chambers 55 and 57 with main chamber 45. Thus, the lubricating fluid entering auxiliary chambers 55 and 57 via passageways 61 from main chamber 45 is allowed to flow downward through chambers 55 and 57 and back into main chamber 45 by way of passageways 63 due to gravity. Alternatively, the circulatory and return passageways need not be arranged in such a manner in that the lubricating fluid may be circulated to and from auxiliary chambers 55 and 57 by way of a conventional pump (not shown).

As a result of the recirculation aspect of the lubrication system of this embodiment, the lubricating fluid within auxiliary chambers 55 and 57 which continually lubricates the outer or exterior sides of bearing assemblies 31 and 33 is continually recirculated to and from main lubrication chamber 45 so as to maintain clean, cool, and effective lubricating fluid within the auxiliary chambers. Thus, both the inner and outer sides of bearing assemblies 31 and 33 are simultaneously lubricated by way of lubricating fluid disposed within chambers 45, 55, and 57.

While much of the lubricating fluid disposed within auxiliary chambers 55 and 57 makes its way back into main chamber 45 through return passageways 63, some of the lubricating fluid or oil within the auxiliary chambers makes its way around bearing balls 43 disposed between frame portions 39 and 41 and thereafter back into main chamber 45.

As will be recognized by those of skill in the art, some of the lubricating fluid directed at the inner sides of bearing assemblies 31 and 33 from main chamber 45 inevitably makes its way around bearing balls 43 and into auxiliary chambers 55 and 57. Thus, a continual and improved lubrication of bearing assemblies 31 and 33 including bearing balls 43 is achieved as a result of the lubrication systems of the different embodiments of this invention.

While lubricating fluid level 47 within main chamber 45 is shown in FIGS. 1 and 2 as being maintained at a level adjacent the lower edge of return passageway 63 adjacent double row bearing assembly 31, oil level 47 in certain embodiments of this invention may be maintained at a level up to and including one positioned about half-way up any bearing balls 43 of either assembly 31 or 33. Such a level would provide satisfactory bearing lubrication.

As shown in FIGS. 1-2, dispenser 35 affixed to pump shaft 7 is positioned entirely above lubricating fluid level 47 in certain embodiments of this invention. The maintaining of level 47 entirely below the lower edge of dispenser 35 allows dispenser 35 to rotate along with pump shaft 7 without contacting the main body of lubricating fluid at and below level 47. In contrast with the prior art where the dispenser contacts the main body of oil, the design of this embodiment allows for less heat generation within chamber 45 because there is no physical contact by dispenser 35 with the main body of lubricating fluid. This also allows level 47 to be maintained at a lower position thereby resulting in less fluid leakage from main lubrication chamber 45 which is important in that oil leakage from chamber 45 can be harmful to other moving parts of pump 1 and can ultimately contaminate the surrounding environment or fluid being pumped.

Furthermore, by maintaining oil level 47 below bearing balls 43, the amount of dirt or other contaminants permitted to flow into the bearing raceways adjacent bearing balls 43 is reduced thus prolonging the working life of bearing assemblies 31 and 33, and pump 1.

With reference to FIG. 1, auxiliary chambers 55 and 57 are disposed between the outer sides of bearing assemblies 33, 31 and clearance seals 70. While clearance seal 70 is shown only adjacent auxiliary chamber 57, a similar seal is positioned adjacent chamber 55, this seal being disposed between motor 3 and the auxiliary chamber. Clearance seals 70 act to seal the lubricating fluid within auxiliary chambers 55 and 57 thus preventing leakage. Clearance seals 70 are more fully discussed and described in commonly owned co-pending U.S. Ser. No. 08/214,320 filed on Mar. 17, 1994, the disclosure of which is incorporated herein by reference.

Further shown in FIG. 1 is sealing flange 72 affixed to pump shaft 7 between impeller 9 and bearing clearance seal assembly 70 adjacent bearing assembly 31. Sealing flange 72 rotates along with pump shaft 7 when driven by motor 3 such that annular sealing members 74 affixed to flange 72 create a sealing interface with stationary seals (not shown) disposed immediately adjacent thereto. The structural details and functional description of the seal construction including flange 72 and sealing members 74 is more thoroughly discussed and described in commonly owned U.S. Ser. No. 08/200,012 filed Feb. 22, 1994, the disclosure of which is hereby incorporated herein by reference.

In a typical operation of the lubrication system of the aforesaid embodiment of this invention shown in FIGS. 1–4, main lubrication chamber 45 is filled with conventional lubricating fluid (e.g. oil) up to about a level corresponding to level 47 shown in FIGS. 1–2. Thereafter, when pump 1 is switched into its operating state by the operator, motor 3 drives motor shaft 5 which in turn drives pump shaft 7. Dispenser 35 affixed to pump shaft 7 rotates therewith within main lubrication chamber 45 as do rotating bearing frame portions 39 which are also fixedly attached to pump shaft 7. Annular bearing frame portions 41 which circumferentially surround shaft 7 are fixedly mounted to pump housing 11 and maintained stationary thus allowing bearing balls 43 to move circumferentially around pump shaft 7 via their corresponding annular raceways defined between annular frame portions 39 and 41. This conventional functionality of bearing assemblies 31 and 33 allows pump shaft 7 to be rotatingly supported against radial movement and vibration.

As dispenser 35 rotates along with pump shaft 7, the double-sided vane construction provided thereon including continuous vane 50 and laterally extending vanes 51 creates an air flow or air current within chamber 45. Because dispenser 35 is not in physical contact with the main body of oil disposed below and at fluid level 47, the lubrication system depends on this air flow for dispersing the oil or other conventional lubricating fluid throughout main chamber 45.

Due to the substantially symmetrical provision of lateral vanes 51 on either side of continuous vane 50, dispenser 35 disperses (splashes and/or mists) the lubricating oil in substantially equal amounts towards bearing assemblies 31 and 33 respectively. The air flow created by vanes 50 and 51 disperses the oil throughout the entire interior of chamber 45. Thus, the inner or interior sides of bearing assemblies 31 and 33 are hit with the lubricating oil which makes its way between frame portions 39 and 41 and into the annular raceways housing bearing balls 43. In such a manner, the inner sides of bearing assemblies 31 and 33 are continually lubricated while pump 1 is being operated.

The oil directed by dispenser 35 toward the upper side of main chamber 45 hits the interior surface of pump housing 11 which is tapered upward towards apex 65. This tapered surface allows the oil hitting housing 11 to be directed laterally downward due to gravity towards passageways 61. Upon reaching passageways 61, the oil flows from main chamber 45 downward into auxiliary lubrication chambers 55 and 57 respectively, each auxiliary chamber being disposed on an opposite side of main chamber 45 in certain embodiments of this invention.

Upon reaching auxiliary chambers 55 and 57, the lubricating oil proceeds downward due to gravity, some of the oil proceeding down and around shaft 7 while other portions thereof proceed into the annular gap defined between bearing frame portions 39 and 41. The portion of oil proceeding into this gap lubricates bearing balls 43 within their corresponding raceways, some of this fluid inevitably making its way around balls 43 and back into main chamber 45.

The portion of oil which reaches pump shaft 7 proceeds therearound, still within auxiliary chambers 55 and 57 which circumferentially surround shaft 7. Upon reaching the lower side of bearing assemblies 31 and 33, the oil disposed within auxiliary chambers 55 and 57 makes its way either back into main lubrication chamber 45 via return passageway 63 or proceeds into the annular gap (one gap corresponding to each chamber 55 and 57) defined between lower frame portions 39 and 41 and lubricates bearing balls 43, this gap, of course, being the same annular gap discussed above with respect to the portion of chambers 55 and 57 above shaft 7, this annular gap circumferentially surrounding shaft 7. Some of the oil which flows from auxiliary chambers 55 and 57 into the annular raceways housing balls 43 is forced backward into chambers 55 and 57 while other portions inevitably make their way around balls 43 and back into main chamber 45. In such a manner, the lubricating fluid within chambers 45, 55, and 57 is continually circulated to and from both sides of bearing assemblies 31 and 33 so as to constantly keep clean, cool, and effective lubricating fluid in and adjacent the bearing assemblies. Therefore, the operating life of bearing assemblies 31 and 33 as well as pump 1 are prolonged as a result of the lubrication system design of the different embodiments of this invention.

In sum, the lubrication system of the various embodiments of this invention improves upon the performance of two very important functions. Firstly, both sides of bearing assemblies 31 and 33 are continuously lubricated with clean, cool, and effective lubricating fluid due to the circulatory aspect of the system. Secondly, the maintaining of fluid level 47 entirely below dispenser 35 and bearing balls 43 reduces heat generation within chamber 45 thereby allowing bearing assemblies 31 and 33 to run at lower temperatures. The overall result being a prolonged operating life of bearing assemblies 31 and 33 as well as pump 1.

The above-described and illustrated elements of the various embodiments of this invention are manufactured and connected to one another by conventional methods commonly used throughout the art.

Once given the above disclosure, therefore, various other modifications, features, or improvements will become apparent to the skill artisan. Such other features, modifications, and improvements are thus considered a part of this invention, the scope of which is to be determined by the following claims.

I claim:

1. A motor driven pump comprising:

a pumping chamber in which fluid to be pumped is pumped between a fluid inlet and a fluid outlet;

a motor for driving a shaft having first and second ends, said first end affixed to said motor and said second end connected to a fluid pumping impeller, said impeller being disposed within said pumping chamber for pumping said fluid to be pumped from said fluid inlet toward said fluid outlet;

a main lubrication chamber housing a lubricating fluid disposed along said shaft, said lubricating fluid for lubricating a shaft bearing assembly rotatably supporting said shaft, said bearing assembly disposed adjacent said main chamber;

a dispenser affixed to said shaft within said main lubrication chamber for rotation therewith, said dispenser for dispersing said lubricating fluid housed in said main lubrication chamber throughout said main chamber and toward the inner side of said shaft bearing assembly, said inner side facing said dispenser;

a lubricating fluid circulatory passageway connecting said main lubrication chamber with an auxiliary lubrication chamber, said auxiliary chamber for allowing said lubricating fluid therein to lubricate the outer side of said shaft bearing assembly, and wherein said circulatory passageway permits said lubricating fluid to make its way from said main lubrication chamber to said auxiliary lubrication chamber disposed adjacent the outer side of said shaft bearing assembly so that both the inner and outer sides of said shaft bearing assembly are simultaneously lubricated by said lubricating fluid within said main and auxiliary lubrication chambers respectively thereby providing improved bearing lubrication and reduced friction so as to prolong the operating life of said bearing assembly; and an inclined lubricating fluid return passageway directly connecting said auxiliary lubrication chamber to said main lubrication chamber such that lubricating fluid disposed within said auxiliary lubrication chamber is caused by gravity to flow back into said main lubrication chamber from said auxiliary lubrication chamber by way of said return passageway.

2. The pump of claim 1, wherein said circulatory passageway interfaces the upper portion of said main lubrication chamber with said auxiliary lubrication chamber so that lubricating fluid which is dispersed by said dispenser upward to the top of said main lubrication chamber is redirected via said circulatory passageway toward and into said auxiliary chamber.

3. The pump of claim 2, wherein said circulatory passageway is disposed above said return passageway with respect to gravity so that lubricating fluid flowing from said main lubrication chamber into said auxiliary lubrication chamber by way of said circulatory passageway flows downward through said auxiliary lubrication chamber from said circulatory passageway to said return passageway as a result of gravity.

4. The pump of claim 1, wherein said bearing assembly is a double row bearing assembly and wherein said pump further comprises another bearing assembly affixed to said shaft, said double row and another bearing assemblies being coaxially mounted along said shaft and spaced from one another so as to sandwich said main lubrication chamber and dispenser therebetween; and wherein the outer side of each bearing assembly is disposed directly adjacent a separate and distinct auxiliary lubrication chamber whereby two auxiliary lubrication chambers and corresponding circulatory passageways are provided, one on each side of said main lubrication chamber.

5. The pump of claim 1, wherein said dispenser is disposed entirely above the lubricating fluid level in said main lubrication chamber so as to reduce heat generation within said main chamber, said dispenser having a plurality of vanes thereon for creating an air-flow within said main lubrication chamber, said air-flow causing said lubricating fluid to be dispersed, throughout said main lubrication chamber so as to lubricate said shaft bearing assembly.

6. A motor driven pump comprising:

a motor driven pump shaft connected to a motor at one end thereof;

first and second coaxially aligned pump shaft bearing assemblies surrounding and rotatably supporting said pump shaft, said first and second bearing assemblies being spaced apart from one another along said pump shaft;

a main lubrication chamber disposed along said pump shaft adjacent and between said first and second pump shaft bearing assemblies, said main lubrication chamber housing lubricating fluid for lubricating said first and second bearing assemblies disposed adjacent said main lubrication chamber;

a lubricating fluid dispenser affixed to said pump shaft for rotation therewith, said dispenser being disposed within said main lubrication chamber substantially entirely above the lubricating fluid level and between said first and second pump shaft bearing assemblies, and wherein said dispenser when rotated along with said pump shaft creates an air-flow within said main lubrication chamber which causes said lubricating fluid to be dispersed throughout said main lubrication chamber so as to continually lubricate said first and second bearing assemblies as said pump shaft is rotated by said motor, the positioning of said dispenser substantially entirely above the lubricating fluid level reducing heat generation within said main chamber so as to allow said first and second bearing assemblies to run at reduced temperatures so as to prolong the operating life of the assemblies.

7. The pump of claim 6, wherein said dispenser includes a plurality of air-flow creating vanes for creating said air-flow within said main lubrication chamber which causes said lubricating fluid to be dispersed throughout said main chamber and lubricate said first and second bearing assemblies.

8. The pump of claim 7, wherein said dispenser is substantially annular in nature and one of said air-flow creating vanes is a continuous vane disposed substantially completely around the circumference of said dispenser.

9. The pump of claim 8, wherein said air-flow creating vanes include multiple lateral vanes extending along said shaft away from said continuous vane, said lateral vanes extending in directions substantially perpendicular to said continuous vane.

10. The pump of claim 9, wherein said lateral vanes extend from both sides of said continuous vane, one side facing said motor and the other side facing an impeller affixed to said shaft, said lateral vanes being arranged in such a manner so as to disperse said lubricating fluid within said main chamber in substantially equal amounts toward said first and second bearing assemblies.

11. The pump of claim 6, further comprising:

first and second auxiliary lubrication chambers, said first bearing assembly being disposed between said main and first auxiliary lubrication chambers such that one side of said first bearing assembly faces and is lubricated by lubricating fluid housed within said main lubrication chamber and the other side of said first bearing assembly faces and is lubricated by lubricating fluid disposed within said first auxiliary lubrication chamber;

said second bearing assembly being disposed between said main lubrication chamber and said second auxiliary lubrication chamber such that both sides of said second bearing assembly are simultaneously lubricated by lubricating fluid disposed within said main and second auxiliary lubrication chambers respectively; and wherein each of said first and second auxiliary lubrication chambers include first and second flow passageways communicating with said main lubrication chamber, said first passageways for allowing lubricating fluid to flow from said main chamber to said first and second auxiliary chambers respectively and said second passageways for permitting lubricating fluid within said auxiliary chambers to return to said main lubrication chamber from said first and second auxiliary chambers respectively.

12. A motor driven pump comprising:

a pumping chamber in which fluid to be pumped is pumped between a fluid inlet and a fluid outlet;

a motor for driving a shaft having first and second ends, said first end affixed to said motor and said second end connected to a fluid pumping impeller, said impeller being disposed within said pumping chamber for pumping said fluid to be pumped from said fluid inlet toward said fluid outlet;

a main lubrication chamber housing a lubricating fluid disposed along said shaft, said lubricating fluid for lubricating a shaft bearing assembly rotatably supporting said shaft, said bearing assembly disposed adjacent said main chamber;

a dispenser affixed to said shaft within said main lubrication chamber for rotation therewith, said dispenser for dispersing said lubricating fluid housed in said main lubrication chamber throughout said main chamber and toward the inner side of said shaft bearing assembly, said inner side facing said dispenser;

a lubricating fluid circulatory passageway interfacing said main lubrication chamber with an auxiliary lubrication chamber, said auxiliary chamber for allowing said lubricating fluid therein to lubricate the outer side of said shaft bearing assembly, and wherein said circulatory passageway permits said lubricating fluid to make its way from said main lubrication chamber to said auxiliary lubrication chamber disposed adjacent the outer side of said shaft bearing assembly so that both the inner and outer sides of said shaft bearing assembly are simultaneously lubricated by said lubricating fluid within said main and auxiliary lubrication chambers respectively thereby providing improved bearing lubrication and reduced friction so as to prolong the operating life of said bearing assembly;

an inclined return passageway for permitting the lubricating fluid to flow from said auxiliary chamber back into said main chamber; and wherein the lubricating fluid level within said main lubricating chamber is located entirely below both bearing balls of said bearing assembly and a portion of said bearing assembly which rotates along with said shaft so as to reduce heat generation caused by rotation of said shaft and bearing balls.

13. The pump of claim 12, wherein said dispenser affixed to said shaft is spaced from said lubricating fluid level in said main lubrication chamber such that an air-flow created by rotation of said dispenser causes said lubricating fluid to be dispersed throughout said main lubrication chamber thereby lubricating said bearing assembly from both its inner and outer sides via said main and auxiliary chambers respectively, and wherein said main chamber is larger with respect to volume than said auxiliary chamber.

* * * * *